(12) United States Patent
Ellis et al.

(10) Patent No.: US 7,153,334 B2
(45) Date of Patent: Dec. 26, 2006

(54) FUEL REFORMING SYSTEM AND METHOD OF OPERATION

(75) Inventors: Suzanne Rose Ellis, Reading (GB); Jessica Grace Reinkingh, Malvern, PA (US); Jullian Elaine Bailie, Reading (GB); David Wails, Reading (GB); Michael Ian Petch, Reading (GB)

(73) Assignee: General Motors Corporation, Detroit, MI (US)

( * ) Notice: Subject to any disclaimer, the term of this patent is extended or adjusted under 35 U.S.C. 154(b) by 703 days.

(21) Appl. No.: 10/442,693

(22) Filed: May 21, 2003

(65) Prior Publication Data

US 2004/0231616 A1 Nov. 25, 2004

(51) Int. Cl.
*C01B 3/32* (2006.01)
*C01B 3/24* (2006.01)

(52) U.S. Cl. .................. 48/198.7; 48/197 R; 48/198.1; 48/127.1; 48/198.8; 48/197 FM; 48/212; 48/127.9; 48/61; 422/176; 422/177; 422/178; 422/181; 422/183; 422/211; 422/220; 423/650; 423/652; 423/648.1; 423/653; 423/651

(58) Field of Classification Search .................. 48/61, 48/127.9, 197 R–198.8, 212; 422/176–181, 422/211–220; 423/648.1–653
See application file for complete search history.

(56) References Cited

U.S. PATENT DOCUMENTS

| 1,826,974 A | 10/1931 | Williams |
| 2,119,565 A | 6/1938 | Williams |
| 2,898,290 A | 8/1959 | Swabb, Jr. |
| 3,965,252 A | 6/1976 | Kmecak et al. |
| 4,499,205 A | 2/1985 | Masuda |
| 4,501,823 A | 2/1985 | Masuda |
| 4,755,498 A | 7/1988 | Setzer et al. |
| 4,927,857 A | 5/1990 | McShea, III et al. |
| 5,023,276 A | 6/1991 | Yarrington et al. |
| 5,130,114 A | 7/1992 | Igarashi |
| 5,993,619 A | 11/1999 | Bloomfield et al. |
| 6,143,159 A | 11/2000 | Bloomfield et al. |
| 6,245,303 B1 | 6/2001 | Bentley et al. |
| 6,284,398 B1 | 9/2001 | Kiryu |
| 6,348,278 B1 | 2/2002 | LaPierre et al. |
| 6,423,435 B1 * | 7/2002 | Autenrieth et al. ........... 429/13 |
| 6,436,363 B1 | 8/2002 | Hwang et al. |
| 6,455,182 B1 | 9/2002 | Silver |
| 6,458,334 B1 | 10/2002 | Tamhankar et al. |

(Continued)

FOREIGN PATENT DOCUMENTS

EP 0 333 037 9/1989

(Continued)

*Primary Examiner*—Glenn Caidarola
*Assistant Examiner*—Vinit H. Patel
(74) *Attorney, Agent, or Firm*—Dinsmore & Shohl LLP

(57) ABSTRACT

Carbonaceous material is removed from a catalyst within an autothermal reformer by introducing an isolated oxidant stream into the autothermal reformer prior to introduction of hydrocarbon fuel into the reformer. A hydrocarbon stream is introduced into the autothermal reformer following removal of the carbonaceous material. A concurrent supply of the hydrocarbon stream and the oxidant stream to the autothermal reformer is maintained such that an exothermic reaction driven by the oxidant stream provides heat to an endothermic reaction driven by water vapor in the hydrocarbon stream. In accordance with 37 CFR 1.72(*b*), the purpose of this abstract is to enable the United States Patent and Trademark Office and the public generally to determine quickly from a cursory inspection the nature and gist of the technical disclosure. The abstract will not be used for interpreting the scope of the claims.

38 Claims, 3 Drawing Sheets

U.S. PATENT DOCUMENTS

| | | |
|---|---|---|
| 6,521,204 B1 | 2/2003 | Borup et al. |
| 6,524,550 B1 | 2/2003 | Chintawar et al. |
| 6,566,573 B1 | 5/2003 | Bharadwaj et al. |
| 6,616,909 B1 | 9/2003 | Tonkovich et al. |
| 6,624,116 B1 | 9/2003 | Bharadwaj et al. |
| 6,627,572 B1 | 9/2003 | Cai et al. |
| 6,695,983 B1 * | 2/2004 | Prasad et al. ............... 252/373 |
| 6,777,117 B1 | 8/2004 | Igarashi et al. |
| 6,899,861 B1 | 5/2005 | Burch et al. |
| 6,916,458 B1 | 7/2005 | Kushida et al. |
| 6,919,062 B1 | 7/2005 | Vasileiadis et al. |
| 7,025,903 B1 * | 4/2006 | Grieve et al. ............... 252/373 |
| 2001/0008621 A1 * | 7/2001 | Christensen et al. ..... 423/418.2 |
| 2002/0009408 A1 | 1/2002 | Wieland et al. |
| 2002/0028744 A1 | 3/2002 | Petit-Clair et al. |
| 2002/0059753 A1 | 5/2002 | Ichikawa |
| 2002/0063001 A1 | 5/2002 | Lennevi |
| 2002/0088179 A1 | 7/2002 | Lesieur et al. |
| 2002/0088740 A1 | 7/2002 | Krause et al. |
| 2002/0094310 A1 | 7/2002 | Krause et al. |
| 2004/0184985 A1 | 9/2004 | Anzai et al. |
| 2004/0191165 A1 | 9/2004 | Anzai et al. |
| 2005/0261383 A1 | 11/2005 | Xie et al. |

FOREIGN PATENT DOCUMENTS

| | | |
|---|---|---|
| GB | 2247465 A | 3/1992 |
| WO | WO 99/48805 | 9/1999 |

\* cited by examiner

FUEL REFORMING SYSTEM AND METHOD OF OPERATION

BACKGROUND OF THE INVENTION

The present invention relates to hydrocarbon reformation and, more particularly, to the reformation of a hydrocarbon stream in the production of hydrogenous fuels.

BRIEF SUMMARY OF THE INVENTION

Carbonaceous material is removed from a catalyst within an autothermal reformer and catalyst heating mechanisms are improved by introducing an isolated oxidant stream into the autothermal reformer prior to introduction of hydrocarbon fuel into the reformer. A hydrocarbon stream is introduced into the autothermal reformer following removal of the carbonaceous material. A concurrent supply of the hydrocarbon stream and the oxidant stream to the autothermal reformer is maintained such that an exothermic reaction driven by the oxidant stream provides heat to an endothermic reaction driven by water vapor added to the hydrocarbon stream.

In accordance with one embodiment of the present invention, a method of operating a fuel reforming system comprising an autothermal reformer is provided. According to the method, carbonaceous material is removed from a catalyst within the autothermal reformer and the temperature of the catalyst is increased by introducing an isolated oxidant stream into the autothermal reformer. The oxidant stream is substantially free of hydrocarbon fuel and water vapor and is introduced into the autothermal reformer when a temperature of the catalyst is low enough to ensure that heat generated from an exothermic reaction of the oxidant stream and the carbonaceous material is insufficient to raise the temperature of the catalyst above the maximum operating temperature $T_{MAX}$ of the catalyst. A hydrocarbon stream is introduced into the autothermal reformer following removal of a substantial portion of the carbonaceous material from the catalyst by the isolated oxidant stream. A concurrent supply of the hydrocarbon stream and the oxidant stream to the autothermal reformer is maintained such that an exothermic reaction driven by the oxidant stream provides heat to an endothermic reaction driven by the water vapor in the hydrocarbon stream. A hydrogenous gas product stream is generated from the exothermic and endothermic reactions.

In accordance with another embodiment of the present invention, a fuel reforming system comprising an autothermal reformer and a system controller is provided. The system controller is programmed to (i) affect removal of carbonaceous material from a catalyst within the autothermal reformer and increasing the temperature of the catalyst by causing an isolated oxidant stream to be introduced into the autothermal reformer, wherein the oxidant stream is introduced into the autothermal reformer when a temperature of the catalyst is low enough to ensure that heat generated from an exothermic reaction of the oxidant stream and the carbonaceous material is insufficient to raise the temperature of the catalyst above the maximum operating temperature $T_{MAX}$ of the catalyst; (ii) cause a hydrocarbon stream to be introduced into the autothermal reformer following removal of the carbonaceous material; and (iii) cause a concurrent supply of the hydrocarbon stream and the oxidant stream to the autothermal reformer to be maintained such that an exothermic reaction driven by the oxidant stream provides heat to an endothermic reaction driven by the water vapor in the hydrocarbon stream.

Additional embodiments of the present invention may be gleaned from the present specification.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which.

DETAILED DESCRIPTION

Figure 1:
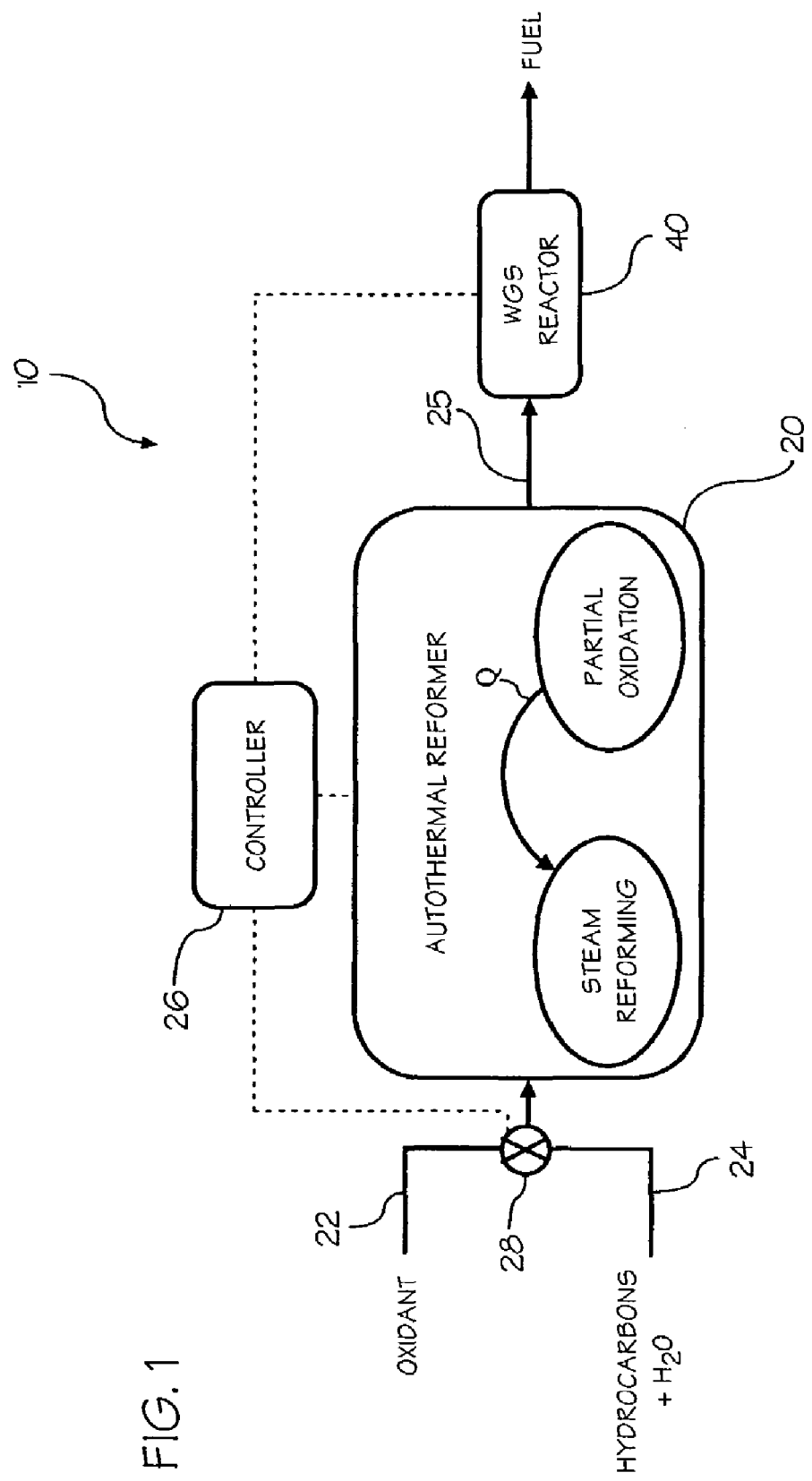
FIG. 1 is a schematic illustration of a fuel reforming system according to one embodiment of the present invention.

Referring now to FIG. 1, the present invention relates to a fuel reforming system 10 and a method of operating a fuel reforming system comprising an autothermal reformer 20. As will be appreciated by those familiar with hydrocarbon reforming, autothermal reformers combine the processes of steam reforming and partial oxidation reforming. Further, steam reforming reactions are typically endothermic and partial oxidation reforming reactions are typically exothermic. Accordingly, the heat Q from the partial oxidation reforming reaction may be provided for the endothermal process of the steam reforming reaction.

The specific reformer configuration and catalyst criteria utilized in affecting steam reforming and partial oxidation reforming in the autothermal reactor 20 of the present invention are beyond the scope of the present invention. For example, by way of illustration and not limitation, the reformer may be configured to generate a hydrogenous gas product stream comprising $H_2$ and at least one of CO and $CO_2$ from a hydrocarbon stream.

For the purposes of describing and defining the present invention, it suffices to note that the respective reactions can be run in separate catalytic reactors in good thermal contact, in a single catalytic reactor, or in any other suitable manner. It is also noted that reference to a "catalyst" herein contemplates the use of a single element catalyst, a catalytic compound, a combination of independent catalytic compounds or elements, a plurality of independent catalyst elements or compounds, or any other suitable catalytic material.

Figure 2:
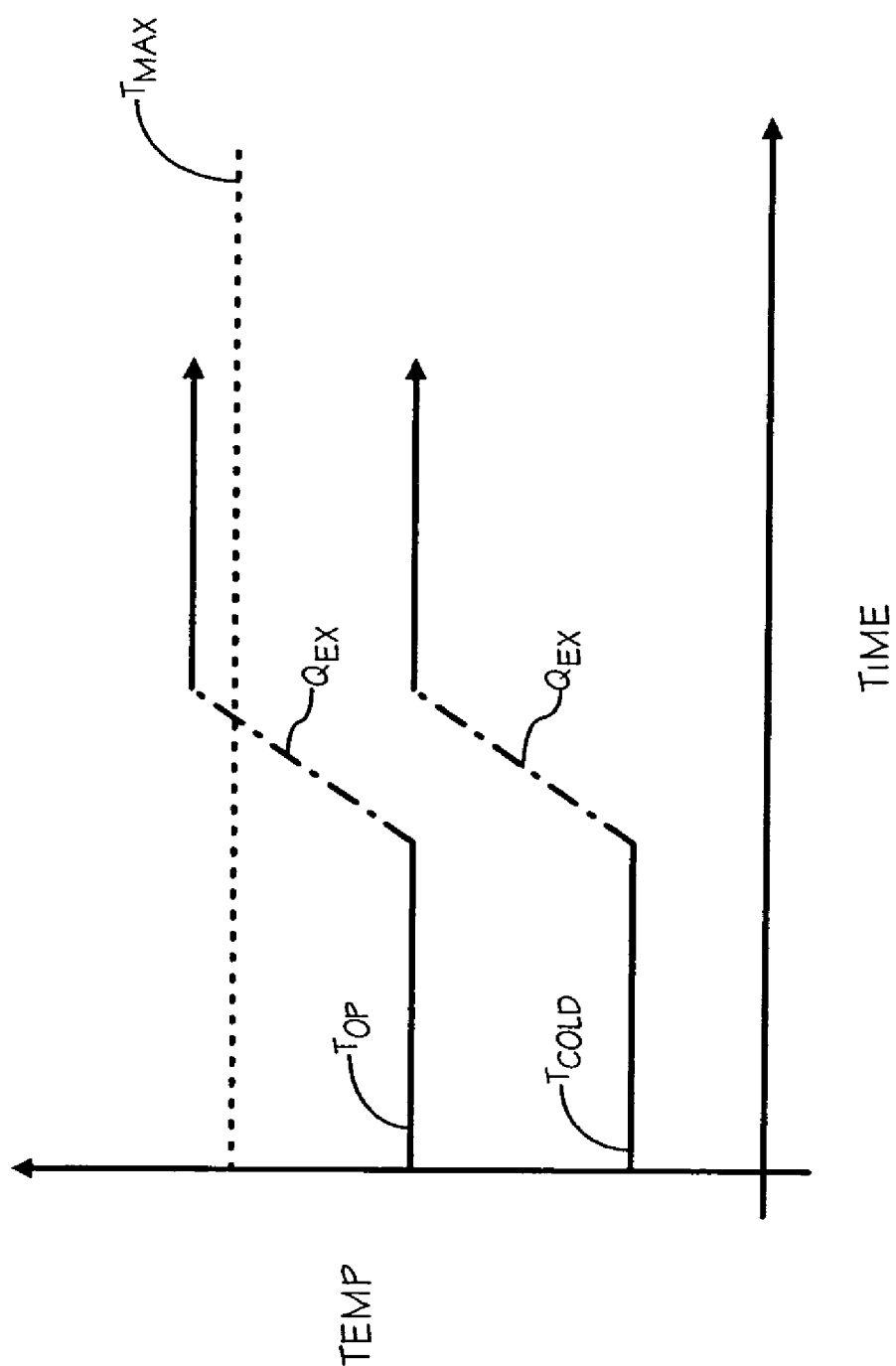
FIG. 2 is a graphic illustration of temperature changes of a catalyst utilized in a fuel reforming system according to one embodiment of the present invention.

The present inventors have recognized that autothermal reformer catalysts may be characterized by a number of different temperatures or temperature states. For example, the "light-off" temperature of a catalyst is the temperature at which the catalyst contributes to the reforming process, for example, by converting HC to desirable reactant products like $CO_2$, CO and $H_2$. The catalytic carbon burn off temperature of a catalyst is the temperature above which an carbon/oxygen exothermic reaction will be initiated by an oxidant passing over a carbon-contaminated catalyst. Referring to FIG. 2, reformer catalysts may also be characterized by a maximum operating temperature $T_{MAX}$, i.e., a temperature above which the catalyst experiences significant physical damage or structural degradation or above which the catalyst ceases to operate effectively.

According to the present invention, carbonaceous material contaminating a reformer catalyst is removed from the catalyst within the autothermal reformer 20 by introducing an isolated oxidant stream 22 into the autothermal reformer 20. The resulting exothermic reaction of the oxidant and the carbonaceous material results in removal of the carbonaceous material and increases the temperature of the catalyst, reducing some of the challenges associated with reformer start-up.

To ensure that the heat generated from the exothermic reaction of oxygen in the oxidant stream 22 and the carbonaceous material in the reformer 20 does not raise the temperature of the catalyst above its operating temperature, or above a temperature at which thermal damage to the catalyst would occur, the oxidant stream 22 is introduced into the autothermal reformer 20 when the temperature of the reformer catalyst is low enough to ensure that heat generated from an exothermic reaction of the oxidant stream and the carbonaceous material is insufficient to raise the temperature of the catalyst above the maximum operating temperature $T_{MAX}$ of the catalyst. The oxidant stream 22 may be introduced when the temperature of the reformer catalyst is above or below its catalytic light-off temperature. The temperature of the catalyst should be at least high enough to generate the carbon burn-off exotherm, i.e., at least as high as the catalytic carbon burn off temperature of the catalyst. In this manner, the isolated oxidant stream may be utilized to raise the temperature of the catalyst safely while removing carbonaceous material. Of course, it is contemplated that the oxidant stream 22 may be introduced when the temperature of the reformer catalyst is below the catalytic carbon burn off temperature of the catalyst, provided heat from the oxidant stream or some other source is able to raise the temperature of the catalyst above the catalytic carbon burn off temperature.

The present inventors have recognized that care must be taken to ensure that the heat $Q_{EX}$ generated by the exothermic reaction of the oxygen and the carbonaceous material 20 will not raise the temperature of the catalyst above $T_{MAX}$. If the exothermic reaction is initiated during operation, at shut-down, immediately following shut-down, or at any other time when the catalyst is near the operating temperature of the reformer 20 $T_{OP}$, the heat $Q_{EX}$ generated by the exothermic reaction will be more likely to raise the temperature of the catalyst above $T_{MAX}$ than it would be if the exothermic reaction were initiated prior to introduction of hydrocarbon fuel into the reformer, near a relatively cool temperature state $T_{COLD}$ of the reformer 20. FIG. 2 illustrates initiation of the exothermic reaction at these two different temperatures and shows how the temperature of the catalyst can be maintained below $T_{MAX}$ despite the increase in temperature attributable to the heat $Q_{EX}$ generated by the exotherm.

For example, the temperature of the catalyst may be maintained below $T_{MAX}$ by introducing the isolated oxidant stream 22 into the autothermal reformer 20 as part of a start-up sequence of the fuel reforming system 10 because the temperature of the catalyst is typically near $T_{COLD}$ at start-up. Although preferred temperatures for introduction of the isolated oxidant stream will vary greatly depending upon the nature of the reformer catalyst and the fuel to be reformed, in some embodiments of the present invention the isolated oxidant stream 20 may be introduced into the autothermal reformer at any time when the temperature of the catalyst is between about 200° C. and about 600° C. or, more commonly, between about 300° C. and about 500° C. The isolated oxidant stream 22 may comprise a substantially pure oxygen stream, a combination of oxygen and an inert gas, or a gaseous mixture, such as air, that includes oxygen. The isolated oxidant stream 22 may be provided such that it is substantially free of hydrocarbon fuel and water vapor. It is contemplated, however, that there may be system reasons to include water vapor in the oxidant stream, particularly where it can be considered inert, i.e., where the catalyst has not reached its catalytic light of temperature.

A hydrocarbon stream 24, typically comprising a hydrocarbon fuel to be reformed and water vapor, is introduced into the autothermal reformer 20 following removal of a substantial portion, a majority, or substantially all of the carbonaceous material from the catalyst by the isolated oxidant stream. In this manner, the operational efficiency and effectiveness of the autothermal reformer 20 may be optimized. It is noted that the desired extent of removal of the carbonaceous material will depend upon the operational preferences of those practicing the present invention. To further optimize the efficiency and the effectiveness of the hydrocarbon reforming process, the hydrocarbon fuel is typically not introduced into the reformer until after the catalyst reaches or exceeds its catalytic light-off temperature. Of course, instances are contemplated where such a condition need not be followed.

As is illustrated in FIG. 1, it is noted that the hydrocarbon stream 24, comprises hydrocarbons and water vapor. Typically, a significant amount of water vapor is added to the hydrocarbon stream, usually as a separate stream. It is contemplated that the hydrocarbon stream 24 may be provided from a single source or separate sources—one providing the hydrocarbon and the other providing the water vapor. In some embodiments of the present invention, it may be preferable to select a catalyst that is non-pyrophoric and is configured to contribute to reformation of hydrocarbon fuels in an initially oxidized state.

Typically, a concurrent supply of the hydrocarbon stream and the oxidant stream to the autothermal reformer are maintained such that the exothermic reaction driven by the oxidant stream provides heat to the endothermic reaction driven by the water vapor in the hydrocarbon stream. The resulting exothermic and endothermic reactions lead to generation of a hydrogenous gas product stream 25 at the output of the reformer 20.

A programmable system controller 26 and an input flow controller 28 may be provided for controlling the manner in which the oxidant and hydrocarbon streams 22, 24 are supplied to the reformer 20. It is contemplated that suitable equipment like power supplies, user interfaces, temperature sensors, flow meters, particulate matter sensors, etc., may be provided to complement the operations of the programmable controller 26.

As is illustrated in FIG. 1, it may be preferable to direct the gas product stream 25 to a water-gas shift reactor 26 configured to convert CO and $H_2O$ to $CO_2$ and $H_2$, particularly where the gas product stream 25 contains significant amounts of CO and $H_2O$. Similarly, it is contemplated that alternative or additional upstream or downstream filters, reformers, or other fuel processing elements may be included in the fuel reforming system of the present invention.

Figure 3:
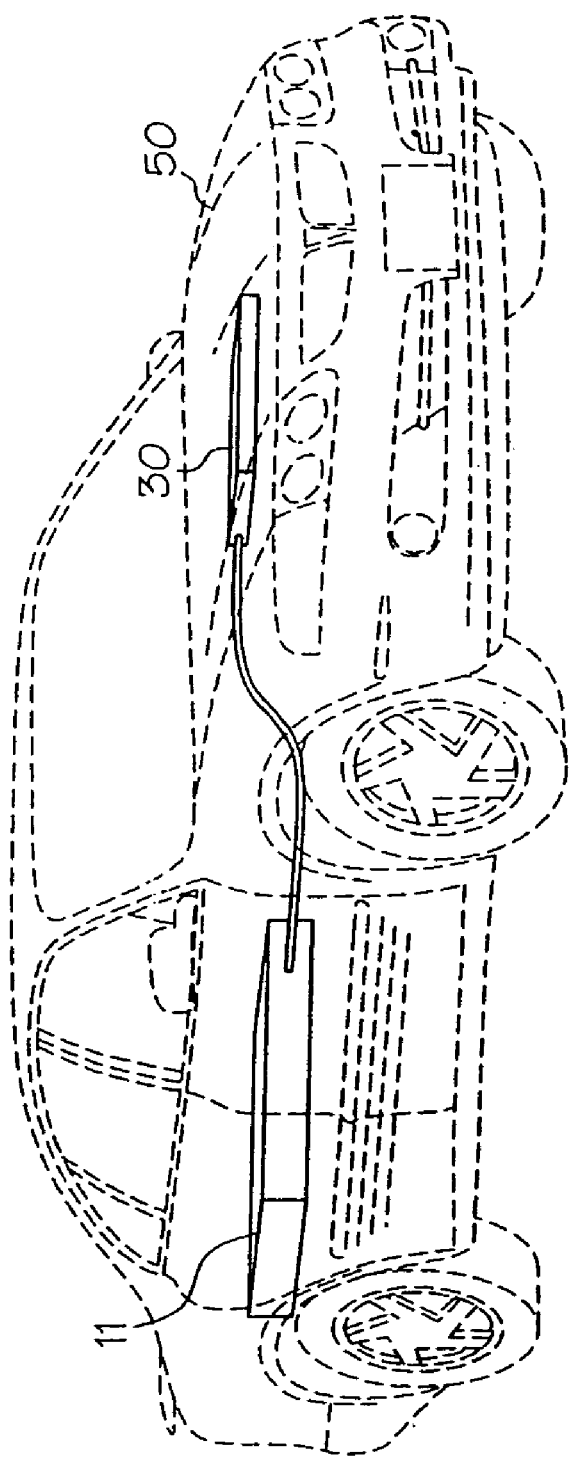
FIG. 3 is a schematic illustration of a vehicle employing a fuel reforming system according to one embodiment of the present invention.

Referring now to FIG. 3, it is noted that fuel reforming systems 10 of the present invention may be configured to operate as part of a fuel reforming unit 11 of a vehicle 50. Specifically, a reformed gas product stream from the fuel reforming unit 11 may be directed to a fuel cell assembly 30 configured to convert reformed fuel, e.g., $H_2$, into electricity. The electricity generated is subsequently used a motive power supply for the vehicle 50 where the electricity is converted to torque and vehicular translational motion.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention, it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of operating a fuel reforming system comprising an autothermal reformer, said method comprising:
   removing carbonaceous material from a catalyst within said autothermal reformer by introducing an isolated oxidant stream into said autothermal reformer, wherein said oxidant stream is substantially free of hydrocarbon fuel and water vapor and is introduced into said autothermal reformer when a temperature of said catalyst is low enough to ensure that heat generated from an exothermic reaction of said oxidant stream and said carbonaceous material is insufficient to raise said temperature of said catalyst above a maximum operating temperature $T_{MAX}$ of said catalyst;
   introducing a hydrocarbon stream into said autothermal reformer following removal of a substantial portion of said carbonaceous material from said catalyst by said isolated oxidant stream, wherein said hydrocarbon stream comprises hydrocarbon fuel and water vapor;
   maintaining concurrent supply of said hydrocarbon stream and said oxidant stream to said autothermal reformer such that an exothermic reaction driven by said oxidant stream provides heat to an endothermic reaction driven by said water vapor in said hydrocarbon stream; and
   generating a hydrogenous gas product stream from said exothermic and endothermic reactions.

2. A method of operating a fuel reforming system as claimed in claim 1 wherein said isolated oxidant stream is introduced into said autothermal reformer as part of a start-up sequence of said fuel reforming system.

3. A method of operating a fuel reforming system as claimed in claim 1 wherein said isolated oxidant stream is introduced into said autothermal reformer when a temperature of said catalyst is above a catalytic light-off temperature of said catalyst.

4. A method of operating a fuel reforming system as claimed in claim 1 wherein said isolated oxidant stream is introduced into said autothermal reformer when a temperature of said catalyst is below a catalytic light-off temperature of said catalyst.

5. A method of operating a fuel reforming system as claimed in claim 1 wherein said isolated oxidant stream is introduced into said autothermal reformer when a temperature of said catalyst is at least as high as a catalytic carbon burn off temperature of said catalyst.

6. A method of operating a fuel reforming system as claimed in claim 1 wherein said hydrocarbon stream is introduced to said autothermal reformer when a temperature of said catalyst is above a catalytic light-off temperature of said catalyst.

7. A method of operating a fuel reforming system as claimed in claim 1 wherein said isolated oxidant stream comprises a substantially pure oxygen stream.

8. A method of operating a fuel reforming system as claimed in claim 1 wherein said isolated oxidant stream comprises oxygen and one or more inert gases.

9. A method of operating a fuel reforming system as claimed in claim 1 wherein said isolated oxidant stream comprises air.

10. A method of operating a fuel reforming system as claimed in claim 1 wherein said removal of said carbonaceous material is affected by said exothermic reaction.

11. A method of operating a fuel reforming system as claimed in claim 1 wherein said hydrocarbon stream is introduced into said autothermal reformer following removal of a majority of said carbonaceous material from said catalyst.

12. A method of operating a fuel reforming system as claimed in claim 1 wherein said hydrocarbon stream is introduced to into said autothermal reformer following removal of substantially all of said carbonaceous material from said catalyst.

13. A method of operating a fuel reforming system as claimed in claim 1 wherein said autothermal reformer comprises a plurality of catalysts.

14. A method of operating a fuel reforming system as claimed in claim 13 wherein at least one of said catalysts is configured to catalyze said exothermic reaction and another of said catalysts is configured to catalyze said endothermic reaction.

15. A method of operating a fuel reforming system as claimed in claim 1 wherein said autothermal reformer comprises a single catalyst.

16. A method of operating a fuel reforming system as claimed in claim 15 wherein said single catalyst is configured to catalyze said exothermic reaction and said endothermic reaction.

17. A method of operating a fuel reforming system as claimed in claim 1 wherein said concurrent supply of said hydrocarbon stream and said oxidant stream to said autothermal reformer are directed to separate catalytic reactors within said autothermal reformer.

18. A method of operating a fuel reforming system as claimed in claim 1 wherein said concurrent supply of said hydrocarbon stream and said oxidant stream to said autothermal reformer are directed to a common catalytic reactor within said autothermal reformer.

19. A method of operating a fuel reforming system as claimed in claim 1 wherein said autothermal reformer is configured to generate $H_2$ and at least one of CO and $CO_2$ from said hydrocarbon stream.

20. A method of operating a fuel reforming system as claimed in claim 1 wherein said hydrogenous gas product stream comprises $H_2$ and at least one of CO and $CO_2$.

21. A method of operating a fuel reforming system as claimed in claim 1 wherein said gas product stream is introduced into a water-gas shift reactor.

22. A method of operating a fuel reforming system as claimed in claim 21 wherein said water-gas shift reactor is configured to convert CO and $H_2O$ to $CO_2$ and $H_2$.

23. A method of operating a fuel reforming system as claimed in claim 1 wherein said method further comprises supplying said gas product stream to a fuel cell configured to convert $H_2$ into electricity.

24. A method of operating a fuel reforming system as claimed in claim 23 wherein said method further comprises utilizing said electricity as a motive power supply for a vehicle.

25. A method of operating a fuel reforming system as claimed in claim 1 wherein said isolated oxidant stream is introduced to said autothermal reformer when a temperature of said catalyst is between about 200° C. and about 600° C.

26. A method of operating a fuel reforming system as claimed in claim 1 wherein said isolated oxidant stream is introduced to said autothermal reformer when a temperature of said catalyst is above about 100° C.

27. A method of operating a fuel reforming system as claimed in claim 1 wherein said hydrocarbon stream is introduced to said autothermal reformer when a temperature of said catalyst is between about 600° C. and about 1000° C.

28. A method of operating a fuel reforming system as claimed in claim 1 wherein said maximum operating temperature $T_{MAX}$ represents a temperature above which said catalyst experiences significant physical damage or structural degradation.

29. A method of operating a fuel reforming system as claimed in claim 1 wherein said maximum operating temperature $T_{MAX}$ represents a temperature above which said catalyst does not operate effectively.

30. A device comprising a fuel reforming system, said fuel reforming system comprising an autothermal reformer, at least one gas input, at least one gas output, and a system controller, wherein said system controller is programmed to:
affect removal of carbonaceous material from a catalyst within said autothermal reformer by causing an isolated oxidant stream to be introduced into said autothermal reformer, wherein said oxidant stream is substantially free of hydrocarbon fuel and water vapor and said oxidant stream is introduced into said autothermal reformer when a temperature of said catalyst is low enough to ensure that heat generated from an exothermic reaction of said oxidant stream and said carbonaceous material is insufficient to raise said temperature of said catalyst above a maximum operating temperature $T_{MAX}$ of said catalyst;
cause a hydrocarbon stream to be introduced into said autothermal reformer following removal of a substantial portion of said carbonaceous material from said catalyst by said isolated oxidant stream, wherein said hydrocarbon stream comprises hydrocarbon fuel and water vapor;
cause a concurrent supply of said hydrocarbon stream and said oxidant stream to said autothermal reformer to be maintained such that an exothermic reaction driven by said oxidant stream provides heat to an endothermic reaction driven by said water vapor in said hydrocarbon stream and such that a hydrogenous gas product stream from said exothermic and endothermic reactions is generated.

31. A device as claimed in claim 30 wherein said device further comprises a hydrocarbon source, a water vapor source, and an oxidant source.

32. A device as claimed in claim 30 wherein said fuel reforming system further comprises a water-gas shift reactor configured to receive said hydrogenous gas product stream and convert CO and $H_2O$ to $CO_2$ and $H_2$.

33. A device as claimed in claim 30 wherein said device further comprises a fuel cell configured to receive said hydrogenous gas product stream and convert $H_2$ into electricity.

34. A device as claimed in claim 33 wherein said device further comprises a motive power supply configured to convert said electricity to torque.

35. A device as claimed in claim 34 wherein said device further comprises a vehicle configured to convert said torque to translational motion.

36. A device as claimed in claim 30 wherein said catalyst comprises a non-pyrophoric catalyst.

37. A device as claimed in claim 34 wherein said catalyst is configured to contribute to reformation of hydrocarbon fuels in an oxidized state.

38. A method of operating a fuel reforming system as claimed in claim 1 wherein said isolated oxidant stream is introduced into said autothermal reformer when a temperature of said catalyst is below a catalytic carbon burn off temperature of said catalyst.

* * * * *